United States Patent [19]

Tsujinaka et al.

[11] Patent Number: 5,633,328

[45] Date of Patent: May 27, 1997

[54] RELEASE COATING COMPOSITION AND RELEASE SHEET

[75] Inventors: Koji Tsujinaka; Ichimoto Akasaki, both of Kanagawa, Japan

[73] Assignee: Nippon Shokubai Co., Ltd., Osaka, Japan

[21] Appl. No.: 404,129

[22] Filed: Mar. 14, 1995

Related U.S. Application Data

[63] Continuation of Ser. No. 82,392, Jun. 28, 1993, abandoned.

[30] Foreign Application Priority Data

Jul. 6, 1992 [JP] Japan .................................. 4-178308
Oct. 16, 1992 [JP] Japan .................................. 4-279002

[51] Int. Cl.$^6$ .................................................. C08L 75/00
[52] U.S. Cl. .......................... 524/589; 524/590; 524/591; 525/452; 525/453; 528/68; 528/69; 428/423.1
[58] Field of Search .......................... 525/452, 453; 524/589, 590, 591; 528/68, 69; 428/423.1

[56] References Cited

U.S. PATENT DOCUMENTS

| | | | |
|---|---|---|---|
| 4,957,808 | 9/1990 | Aorai et al. | 428/262 |

FOREIGN PATENT DOCUMENTS

| | | |
|---|---|---|
| A409218A2 | 1/1991 | European Pat. Off. . |
| A297333 | 11/1954 | Japan . |
| A4017661 | 8/1965 | Japan . |
| B-43-5006 | 2/1968 | Japan . |
| A435006 | 2/1968 | Japan . |
| 0350232 | 3/1991 | Japan . |
| 0350279 | 3/1991 | Japan . |
| A-3-50279 | 3/1991 | Japan . |
| A386776 | 4/1991 | Japan . |
| A-3-86776 | 4/1991 | Japan . |

OTHER PUBLICATIONS

Coatings, V, pp. 427–442, Skeist Incorporated, Whippany, New Jersey 07981, USA, May 1992.

*Primary Examiner*—Paul J. Thibodeau
*Assistant Examiner*—Mary Critharis
*Attorney, Agent, or Firm*—Armstrong, Westerman, Hattori, McLeland, & Naughton

[57] ABSTRACT

The present invention provides a release coating composition which is easy to coat on a matter to be coated and forms a release coating composition layer having high heat resistance and difficulty in release coat transfer to an adhesive layer, and also provides a release sheet having a release coating composition layer of which heat resistance is high and release coat transfer to an adhesive layer is hard to occur. The release coating composition comprises: (A) an addition product between a polyamine compound having at least two of an active hydrogen-containing amino group per one molecule and a monoisocyanate compound having an alkyl group of 8 or more in carbon number; (B) a compound having, per one molecule, at least two of a functional group reactive with an active hydrogen of the amino group; and (C) at least one kind of diluent selected from an organic solvent and water. The release sheet comprises a sheet type base material and a release coating composition layer which has attached to at least one face of the base material and been converted into one united body with the base material, wherein the release coating composition layer comprises a reaction product between the components (A) and (B) of the release coating composition.

30 Claims, No Drawings

RELEASE COATING COMPOSITION AND RELEASE SHEET

This application is a continuation of application Ser. No. 08/082,392 filed Jun. 28, 1993, now abandoned.

BACKGROUND OF THE INVENTION

The present invention relates to a release coating composition and a release sheet. The release coating composition of present invention is used, for example, in the fields described in COATINGS, V, pp. 427–442, SKEIST INCORPORATED WHIPPANY, N.J. 07981 U.S.A., MAY 1992, and used for a pressure sensitive adhesive tape, a pressure sensitive adhesive sheet or the like, of which base material is mainly paper or a plastic film.

Generally, in a pressure sensitive adhesive matter such as a pressure sensitive adhesive tape, a pressure sensitive adhesive shoot and the like which are made by coating a pressure sensitive adhesive on one face or both faces of a sheet type base material (or a sheet type carrier), a release sheet such as release paper and the like is adhered to a pressure sensitive adhesive-coated face (an adhesive face) of the matter in order to protect this face. In case where a pressure sensitive adhesive matter takes the form of a shoot, a tape or the like, the matter is preserved in a wound roll form. In this wound form, a pressure sensitive adhesive-coated fact of the matter which is wound outside is adhered to a backing of the base material (here, the backing of the base material is a face reverse to a pressure sensitive adhesive-coated face of the base material) of the matter which has been wound inside. A release coating composition is coated, to improve releasing performance in use, on the surface of the release sheet (here, the surface of the release sheet is a face to which the pressure sensitive adhesive-coated face of pressure sensitive adhesive matter is adhered), or on the backing of the base material of pressure sensitive adhesive matter which is wound in the roll form.

Hitherto, as a release coating composition, a silicone type and a long chain alkyl type have been industrially produced, and they are used for a pressure sensitive adhesive tape, a pressure sensitive adhesive sheet and the like. In case of using the silicone type release coating composition, because it has usually been cross linked by using a condensation reaction or an additive reaction, it is superior in heat resistance, solvent resistance and water resistance and has high releasing performance because of its low surface activity. However, the silicone type release coating composition has problems in residual tackiness and writing performance (in the specification, writing performance means that writing with water-born ink is possible on the face coated with a release coating composition.) and also, has problems of deteriorating the adhesive strength of a pressure sensitive adhesive tape, a pressure sensitive adhesive sheet and the like because of release coat transfer to an adhesive layer. Therefore, recently, the long chain alkyl type release coating composition has been noticed, which is superior in residual tackiness and writing performance and has releasing performance of medium grade. Practically, for the long chain alkyl type release coating composition there are a polyvinyl alcohol-octadecyl isocyanate adduct (refer to Japanese Official Patent Gazette No. showa 29-7333), a polyethyleneimine-octadecyl isocyanate adduct (refer to Japanese Official Patent Gazette No. showa 40-17661) and the like, and these compounds are in general diluted by a solvent and then coated, however, recently, it has also been attempted that a water dispersion (Japanese Official Patent Provisional Publication Nos. heisei 3-50279 and 3-86776) of the long chain alkyl type release coating composition is diluted by water and then coated.

However, the above-mentioned conventional long chain alkyl type release coating composition has problems that its heat resistance is inferior and it deteriorates the adhesive strength of a pressure sensitive adhesive tape, a pressure sensitive adhesive sheet and the like because of release coat transfer to an adhesive layer.

SUMMARY OF THE INVENTION

Accordingly, it is an object of the present invention to provide a release coating composition which is easy to coat on a matter to be coated and forms a release coating composition layer having high heat resistance and difficulty in release coat transfer to an adhesive layer. Furthermore, it is another object of the present invention to provide a release sheet having a release coating composition layer of which heat resistance is high and of which release coat transfer to an adhesive layer is hard to occur.

Upon considering the aforementioned circumstances, the present inventors intensively studied defects of the conventional long chain alkyl type release coating composition and as a result, they completed the present invention.

The present invention provides a release coating composition comprising the following compound (A), compound (B) and diluent (C), wherein:

the compound (A) is a long chain alkyl addition compound which is a product from an additive reaction between a polyamine compound (a1) and a monoisocyanate compound (a2), said polyamine compound (a1) having at least two of an active hydrogen-containing amino group per one molecule, and said monoisocyanate compound (a2) having an alkyl group of 8 or more in carbon number;

the compound (B) is a compound having, per one molecule, at least two of a functional group capable of reacting with an active hydrogen of the; amino group; and the diluent (C) is at least one of an organic solvent and water.

Also, the present invention provides a release sheet comprising a sheet type base material and a release coating composition layer which has attached to at least one face of the base material and been converted into one united body with the base material, wherein the release coating composition layer comprises a reaction product between the compounds (A) and (B) which are components of the above-mentioned release coating composition.

A polyamine compound (a1) used in the present invention is an active hydrogen-containing polyamine compound having at least two of an active hydrogen-containing amino group (either one or both of a primary amino group (—$NH_2$) and a secondary amino group (—NH—)) per one molecule, and may have both of the amino group and a hydoxyl group. The active hydrogen-containing amino group and hydoxyl group are reaction sites which allow to react with an isocyanate group of the monoisocyanate compound (a2).

The above-mentioned active hydrogen-containing polyamine compound is, for example, one kind or a mixture of two or more kinds selected from a group consisting of a polyalkyleneimine, a polyalkylenepolyamine, polyvinylamine, polyallylamine, a polyamine which has been modified by an alkylene oxide through a ring-opening additive reaction or by adding a hydroxyalkyl (meth)acrylate and the like by a reaction analogous to the Michael additive reaction and contains both of a hydroxyl group and an active hydrogen-containing amino group, and other conventional compounds, The polyalkyleneimine is, in general, produced by a method comprising an ionic polymerization reaction of an alkyleneimine such as ethyleneimine, propyleneimine and the like, by a method comprising polymerizing an oxazoline and then carrying out partial or complete hydrolysis, or by other conventional methods, and the practical examples are polyethyleneimine, polypropyleneimine, polyethylenepropyleneimine and the like. Practical examples of the polyalkylenepolyamine are diethylenetriamine, triethylenetetramine, pentaethylenehaxamine, a condensation compound between ethylenediamine and epichlorhydrin, and the like. Further, for the polyvinylamine, polyallylamine and modified compound thereof there are cited, in addition to unmodified polyvinylamine and unmodified polyallylamine, a compound modified by a copolymerization reaction of polyvinylamine or polyallylamine containing one kind or two or more kinds of monomers, which are selected as copolymerizable monomers from a group consisting of an olefin such as ethylene, propylene and the like; a (meth) acrylamide such as (meth)acrylamide, N,N-dimethyl (meth) acrylamide and the like; an unsaturated carboxylic acid such as (meth) acrylic acid, crotonic acid, maleic acid, fumaric acid, itaconic acid and the like and an ester and anhydride thereof; a sulfonic acid monomer such as vinyl sulfonic acid and the like; a cation-modified monomer such as dimethylaminoethyl (meth)acrylate, vinylimidazole, vinylpyridine, vinylsuccinimide and the like; allyl alcohol. Still further, there may Ice used a compound obtained from further modification of the polyvinylamine, polyallylamine and a modified compound thereof. There can be used one kind of compound or a mixture of two or more kinds of compounds selected from a group consisting of active hydrogen-containing polyamines such as polyalkyleneimine, polyalkylenepolyamine, polyvinylamine, polyallylamine and the like.

The monoisocyanate compound (a2) used in the present invention has an alkyl group of a carbon number of 8 or more, preferably, a carbon number of from 12 to 30. The practical examples are long chain alkyl monoisocyanates such as dodecyl isocyanate, tridecyl isocyanate, tetradecyl isocyanate, pentadecyl isocyanate, hexadecyl isocyanate, octadecyl isocyanate, nonadecyl isocyanate, eicosyl isocyanate and the like. One kind of compound or a mixture of two or more kinds of compounds selected from the group consisting of these long chain alkyl monoisocyanate compounds can be used. If the carbon number of alkyl group which the compound (a2) has is less than 8, there is a problem that releasing performance is not displayed.

The compound (A) used in the present invention is a long chain alkyl addition compound which is a product from an additive reaction between the above-mentioned polyamine compound (a1) and monoisocyanate compound (a2). In this additive reaction, an active hydrogen-containing amino group of the compound (a1) reacts with an isocyanate group of the compound (a2) to form an urea bond. In case where the compound (a1) has a hydroxyl group as well, this hydroxyl group reacts with an isocyanate group of the compound (a2) to form an urethane bond. In producing the compound (A), an additive reaction is generally carried out in an organic solvent, for example, an aromatic solvent such as toluene, xylene and the like; an ester type solvent such as ethyl acetate, butyl acetate and the like; an alicyclic hydrocarbon type solvent such as cyclohexane; an aliphatic hydrocarbon type solvent such as hexane; and other organic solvents, whereby the compound (A) can be obtained as a solution by an organic solvent. Conditions of the additive reaction are not especially limited, however, the reaction is generally carried out in a temperature range of from room temperature to about 150° C. An adding ratio of the compound (a2) to the compound (a1) is not especially limited, however, it is preferable to add the compound (a2) in a ratio of from 0.6 to 1.3 mole times, more preferably from 0.8 to 1.1 mole times, based on the active hydrogen-containing amino group (the total of a primary amino group ($—NH_2$) and a secondary amino group (—NH—)) which the compound (a1) has. If the adding ratio of compound (a2) is less than 0.6 mole times, releasing performance of a release coating composition may be inferior and, if the ratio is more than 1.3 mole times, the compound (a2) may remain unreacted, which deteriorates adhesive strength of a pressure sensitive adhesive in a pressure sensitive adhesive matter and the like.

As occasion demands, a solution of the reaction mixture obtained from the aforementioned additive reaction is mixed with a hydrophilic solvent such as methanol, isopropyl alcohol, acetone and the like to deposit the compound (A), and then filtrating followed by drying the compound (A) can give the compound (A) as powder.

Furthermore, the compound may be, for example, the one obtained as a water dispersion, derived from a production method comprising such post stage-dispersion as described in Japanese Official Patent Provisional Publication No. heisei 3-86776, or from a production method by such reaction dispersion as described in Japanese Official Patent Provisional Publication No. heisei 3-50279.

The compound (B) used in the present invention has, per one molecule, two or more of a functional group capable of reacting with an active hydrogen of the amino group. For example, there are used a polyvalent isocyanate compound, a blocked polyvalent isocyanate compound, a polyvalent epoxy compound, a polyvalent (meth) acryloyl compound, a polyvalent carbonyl compound, a polyvalent active ester compound, a polyvalent methylol compound, a polyvalent ionic metal, a polyvalent aziridinyl compound and the like. Also, the compound (B) may be a compound intramolecularly having two kinds or more of a functional group capable of reacting with an active hydrogen of an amino group. The polyvalent isocyanate compound is a compound having at least two of an isocyanate group, and its examples are an aliphatic-, alicyclic- or aromatic polyvalent isocyanate compound such as 1,6-hexamethylene diisocyanate, isophorone diisocyanate, diphenylmethane diisocyanate, xylilene diisocyanate, toluene diisocyanate and the like, anal in addition, are included a trimer, a modified compound and the like thereof. Furthermore, the blocked polyvalent isocyanate compound is a compound having at least two of a blocked isocyanate group, and its examples are a compound derived from blocking the aforementioned polyvalent isocyanate compound by a blocking agent such as phenol, an oxime, a caprolactam, sodium hydrogen sulfite and the like. Still further, the polyvalent epoxy compound is a compound having at least two of an epoxy group, and its examples are a glycidyl ether compound of a polyvalent alcoholic compound, a polyvalent phenolic compound or a polyvalent amino compound, a glycidyl ester compound of a polyvalent corbonyl compound and, practically, bisphenol A diglycidyl ether, hydrogenated bisphenol A diglycidyl ether, ethylene glycol diglycidyl ether, propylene glycol diglycidyl ether, diethylene glycol diglycidyl ether, polyethylene glycol diglycidyl ether, glycerol triglycidyl ether, sorbitol tetraglycidyl ether, trimethylolpropane triglycidyl ether, pentaerythritol tetraglycidyl ether, N,N,N',N'tetraglycidyl-m- xylenediamine, 1,3-bis(N,N'-diglycidylaminomethyl) cyclohexane, novolak epoxy, and a modified compound thereof, and the like. The polyvalent (meth)acryloyl compound is a compound having at least two of a (meth) acryloyl group, and its examples are a polyvalent (meth) acryloyl compound in which an ester bond has been formed by a dehydration reaction of a compound having a polyvalent hydroxyl group at the terminal, such as a polyvalent alcohol compound, poly(or oligo)ester compound and poly (or oligo) urethane compound, with an unsaturated group-containing carboxylic acid having an unsaturated bond such as (meth) acrylic acid and the like. More practical examples of the polyvalent (meth)acryloyl compound are ethylene glycol di(meth)acrylate, propylene glycol di(meth)acrylate, diethylene glycol di(meth)acrylate, glycerol tri(meth) acrylate, sorbitol tetra(meth)acrylate, trimethylolpropane tri(meth)acrylate, pentaerythritol tetra(meth) acrylate, polyethylene glycol di(meth)acrylate, 2,2-bis(4-((meth) acryloxyethoxy)phenyl)propane and the like. The polyvalent carbonyl compound is a compound having at least two of a carbonyl group, and its examples are glyoxal, glutaraldehyde and the like. The polyvalent active ester compound is a compound having at least two of an active ester group, and its examples are oxalic acid diester, malonic acid diester and the like. The polyvalent methylol compound is a compound having at least two of a methylol group, and is obtained by an addition condensation reaction between an amino group of a polyvalent amino compound and formaldehyde to introduce a methylol group. Its general examples are melamine resin, benzoguanamine resin, urea resin and the like. The polyvalent aziridinyl compound is a compound having at least two of an aziridinyl group, and its example is a compound obtained by an additive reaction between the above-mentioned polyvalent isocyanate compound, polyvalent epoxy compound, polyvalent (meth)acryloyl compound or the like and an alkyleneimine compound such as ethyleneimine, propyleneimine or the like. More practically, it is a compound such as trimet hylolpropanetris(β(N-aziridinyl)propionate), trimethylolpropanetris (β-(N-2-methylaziridinyl) propionate), 1,6-hexamethylenediethylurea, diphenylmethane-bis(4,4'-N,N'-diethylurea) and the like. For the compound intramolecularly having two kinds or more of a functional group capable of reacting with the active hydrogen of an amino group there are cited, for example, a compound such as glycidyl (meth)acrylate, 2(1-aziridinyl)ethyl (meth) acrylate, methylacrylamidoglycolate methyl ether, isocynatoethyl (meth)acrylate and the like.

Among these compounds (B), the polyvalent isocyanate compound, blocked polyvalent isocyanate compound, polyvalent epoxy compound and polyvalent (meth)acryloyl compound operate effectively in the present invention. The compounds (B) having, per one molecule, two or more of a functional group capable of reacting with the active hydrogen of an amino group is generally supplied in the form of liquid, powder, solid, a water dispersion, a matter diluted by water, a matter diluted by an organic solvent and the like.

In the present invention, for combination of the above-mentioned compounds (A) and (B), the compound (B) is preferably in proportion of from 0.5 to 100 parts by weight, more preferably in proportion of from 0.5 to 50 parts by weight, based on 100 parts by weight of the compound (A). In more details, in case where the above-mentioned compound (A) has a molecular weight of 20,000 or higher, it is the most preferable that the compound (B) is in proportion of from 0.5 to 20 parts by weight based on 100 parts by weight of the compound (A). In case where the compound (A) has a molecular weight lower than 20,000, it is the most preferable that the compound (B) is in proportion of from 2.5 to 30 parts by weight based on 100 parts by weight of the compound (A). If the proportion of compound (B) is less than 0.5 parts by weight, the crosslinking degree is too low, so that it may be impossible to prevent the release coat transfer to an adhesive layer or improve heat resistance. If the proportion is more than 100 parts by weight, the crosslinking degree is too high, so that a release coating composition layer formed may be too hard and, furthermore, the adhesive strength of a pressure sensitive adhesive tape, a pressure sensitive adhesive sheet and the like may deteriorate because of a residual uncrosslinked part of the compound (B) and occurrence of the release coat transfer to an adhesive layer.

In a release coating composition of this invention, as occasion demands, either one or both of the above-mentioned compounds (A) and (B) may be dissolved or dispersed in the diluent (C). For example, it is permitted that either one or both of the compounds (A) and (B) are dissolved or dispersed in water, or that the compounds (A) and (B) are dissolved in an organic solvent.

Especially, in case where water is used as the diluent (C), there is no danger of a fire and solvent poisoning in coating a release coating composition to a base material and then carrying out drying to form a release coating composition layer.

Also, in case where water is used as the diluent (C), it is preferable to use a water-dispersible compound as the compound (A) as well as at least one kind of compound selected from a group consisting of a water-dispersible polyvalent isocyanate compound having at least two of a blocked isocyanate group, a water-dispersible polyvalent epoxy compound having at least two of an epoxy group, and a water-soluble polyvalent epoxy compound having at least two of an epoxy group as the compound (B). Here, for the water-dispersible polyvalent isocyanate compound having at least two of a blocked isocyanate group there are cited, for example, 2-butanone oxime-blocked diphenylmethane diisocyanate, 2-butanone oxime-blocked xylilene diisocyanate and the like. Also, for the water-dispersible polyvalent epoxy compound having at least two of all epoxy group there are cited, for example, bisphenol A diglycidyl ether, hydrogenated bisphenol A diglycidyl ether, novolak epoxy and the like. Furthermore, for the water-soluble polyvalent epoxy compound having at least two of an epoxy group there are cited, for example, trimethylolpropane triglycidyl ether, ethylene glycol diglycidyl ether and the like.

Formulation of the compounds (A) and (B) and diluent (C) is not especially limited, however, for example, the total amount of compounds (A) and (B) is in proportion of from 0.1 to 60 wt. % and the amount of diluent (C) is in proportion of from 40 to 99.9 wt. %, with the proviso that the total of the (A), (B) and (C) is 100 wt. %.

In case of using an organic solvent as the diluent (C), for the organic solvent there are generally used one kind or a mixture of two or more kinds selected from an organic solvent group consisting of: an aromatic type organic solvent such as toluene, xylene and the like, an ester type one such as ethyl acetate, butyl acetate and the like, an alicyclic hydrocarbon type one such as cyclohexane and the like, an aliphatic hydrocarbon type one such as hexane and the like, and others.

In case where the compound (B) does not react with water or an alcohol, in addition to the above-mentioned organic solvents, there can be also used one kind or a mixture of two or more kinds selected from a group consisting of water, an alcohol type organic solvent such as methanol, ethanol and the like. Furthermore, even if the compound (B) is, for example, such as a polyvalent isocyanate compound which easily reacts with water, the compound (B) dissolved in a nonaqueous organic solvent such as toluene, xylene, ethyl acetate and the like can be used by dispersing it in water.

In performing the present invention, to improve coating operation performance of a release coating composition, there may optionally be added a commercially available wettability-improver, leveling agent, defoaming agent, thickener, wetting agent and the like to the release coating composition optionally. Also, a vinyl acetate type polymer, an acrylic type polymer and the like may be added as a filler or an extender in a range of not deteriorating the performance of a release coating composition. Also, in general, there may be optionally used a catalyst and the like effective on a reaction of the respective functional groups of the compound (B) having, per one molecule, two or more of a functional group capable of reacting with the active hydrogen of an amino group.

A release coating composition of this invention, in case of preserving the compounds (A) and (B) under a condition of mixing beforehand, is preferably preserved at a temperature lower than room temperature and, in case of preserving the composition at a temperature higher than room temperature, it is preferably preserved in a condition of separating the compounds (A) and (B) from each other.

A release coating composition of this invention can be coated by mixing the compounds (A) and (B) and diluent (C) as well as an additive which is combined in case of necessity, and by using a common coating instrument. Practical examples of the instrument are a roll coater, a gravure coater, a dipping coater and the like.

Examples of a base material on which a release coating composition of the present invention can be coated are a plastic film made of polyethylene, polypropylene, polyester, cellophane and the like, printing paper, craft paper, crape paper, glassine paper and the like, and furthermore, paper treated by a filler such as impregnated paper, plastic coat paper and the like, cloths and so forth.

After a release coating composition of the present invention being coated onto the above-mentioned base material, the compound (A) is crosslinked by the compound (B). Then, drying is carried out. The crosslinking reaction is carried, for example, in a temperature range of from room temperature to 150° C. or lower. By doing like this, a release coating composition layer is formed on a release coating composition-coated face of the above-mentioned base material. This release coating composition layer is attached to the above-mentioned base material and converted into one united body with the base material. In forming a release coating composition layer by doing like this, if a sheet type base material is used, a release sheet is obtained.

On the release coating composition layer of a release sheet of this invention is piled and pressed the face of a pressure sensitive adhesive layer of a pressure sensitive adhesive matter so that the release coating composition layer is brought in contact with the face of the pressure sensitive adhesive layer each other, wherein the pressure sensitive adhesive matter is made by attaching a pressure sensitive adhesive layer onto either one face or both faces of another sheet type base material to convert both the adhesive layer and sheet type base material into one united body. Thereby a pressure sensitive adhesive article is obtained. In this pressure sensitive adhesive article, a pressure sensitive adhesive layer of the pressure sensitive adhesive matter is protected by the release sheet and, in using the article, the release sheet is released from this article and the resultant pressure sensitive adhesive matter is attached onto an adherend by pressing.

Also, a release sheet of this invention is converted into a pressure sensitive adhesive article by attaching a pressure sensitive adhesive layer to a face reverse to the face of a release coating composition layer of the sheet type base material and converting the release sheet and pressure sensitive adhesive layer into one united body. This pressure sensitive adhesive article is usually wound in the roll form so as to direct the face of a release coating composition layer outward and the face of a pressure sensitive adhesive layer inward, and thereby, the pressure sensitive adhesive layer is protected. When used, the article is unwound from outside and then attached onto an adherend by pressing.

A release coating composition layer formed by a release coating composition of this invention is hard to transfer even if it is attached by pressing to any conventional pressure sensitive adhesive layer, and in addition, it has the writing performance.

It is thought that effects of a release coating composition of the present invention is displayed by that a residual active hydrogen-containing amino group or a part of an urea bond both of which are involved in the compound (A) is thermally dissociates by heating carried out after coating to form art active hydrogen-containing amino group which becomes a reaction site with the compound (B) and this active hydrogen-containing amino group reacts with a functional group of the compound (B), or a hydrogen atom in the urea bond of the compound (A) reacts with a functional group of the compound (B) to combine each other. If a practical example is cited, it is that the compound (B) reacts with the urea bond of compound (A) to form a biuret bond in case where the compound (B) is a polyvalent isocyanate compound.

Since the compound (A) is cross linked three-dimensionally by these reactions, a release coating composition layer is converted into a tough film, so that heat resistance is improved and release coat transfer is suppressed. Therefore, it is possible to prevent deterioration of the adhesive strength of a pressure sensitive adhesive tape, a pressure sensitive adhesive sheet and the like. Furthermore, since a release coating composition of the present invention is coated and then crosslinked, there does not take place problems occurring in a release coating composition which has been beforehand converted into high molecular weight by crosslinking the compound (A), that is immediately after production or in the production process, by a polyvalent isocyanate compound; that is; problems that, because a long chain alkyl addition compound which has been crosslinked beforehand is not three-dimensionally crosslinked in forming a film, the transfer of a release coating composition can not be suppressed, or in case of the long chain alkyl addition compound being dispersed in water, there does not occur problems that its melting point becomes high and film-forming performance becomes poor, and that, because the long chain alkyl addition compound which has been crosslinked beforehand is not three-dimensionally crosslinked in forming a film, the transfer of the release coating composition can not be suppressed.

Since a release coating composition of the present invention comprises the aforementioned compound (A), compound (B) and diluent (C), it is early to coat and can form a release coating composition layer of which heat resistance is high and of which release coat transfer is hard to occur, as compared with conventional release coating compositions.

Since a release sheet of the present invention comprises forming a release coating composition layer by using a release coating composition of the present invention, it forms a release coating composition layer which does not show release coat transfer to a pressure sensitive adhesive and in which deterioration of adhesive strength of a pressure sensitive adhesive tape, a pressure sensitive adhesive sheet and the like is hard to occur.

DESCRIPTION OF THE PREFERRED EMBODIMENTS

Hereinafter, the present invention is illustrated by the following examples of some preferred embodiments in comparison with comparative examples not according to the invention. However, the present invention is not limited to the undermentioned examples.

SYNTHETIC EXAMPLE 1

In a reaction vessel equipped with a stirrer, condenser and dropping funnel, there was dispersed 100 parts by weight of polyethyleneimine (number-average molecular weight: 10,000) in 1587 parts by weight of toluene and added 580 parts by weight of octadecyl isocyanate. The mixture obtained was allowed to react at the reflux temperature for 3 hours and then, cooled, thereby a polyethyleneimine-octadecyl isocyanate adduct having 30 wt. % nonvolatile content was produced. Furthermore, this polyethyleneimine-octadecyl isocyanate adduct having 30 wt. % nonvolatile content was washed by methanol and the solvent was removed by distillation under reduced pressure to obtain the adduct as white powder, which showed a melting point of about 90° C.

SYNTHETIC EXAMPLE 2

In a reaction vessel equipped with a stirrer, condenser and dropping funnel, there was dispersed 100 parts by weight of polyethyleneimine (number-average molecular weight: 70,000) in 1517 parts by weight of toluene and added 550 parts by weight of octadecyl isocyanate. The mixture obtained was allowed to react at the reflux temperature for 3 hours and then, cooled, thereby a polyethyleneimine-octadecyl isocyanate adduct having 30 wt. % nonvolatile content was produced. Furthermore, this polyethyleneimine-octadecyl isocyanate adduct having 30 wt. % nonvolatile content was washed by methanol and the solvent was removed by distillation under reduced pressure to obtain the adduct as white powder, which showed a melting point of about 85° C.

SYNTHETIC EXAMPLE 3

In a reaction vessel equipped with a stirrer, condenser and dropping funnel, there was dispersed 100 parts by weight of polypropyleneimine (number-average molecular weight: 5,000) in 1500 parts by weight of toluene and added 400 parts by weight of octadecyl isocyanate. The mixture obtained was allowed to react at the reflux temperature for 5 hours and then, cooled, thereby a polypropyleneimine-octadecyl isocyanate adduct having 25 wt. % nonvolatile content was produced.

SYNTHETIC EXAMPLE 4

Polyethyleneimine (number-average; molecular weight: 1,800), 23 parts by weight, and 36 parts by weight of a cationic surfactant (which was an aqueous solution of stearyltrimethylammonium chloride having 63 wt. nonvolatile content) were dissolved in 675 parts by weight of water to mix them. To the resultant aqueous mixed solution was added 254 parts by weight of an ethyl acetate solution, which was prepared by dissolving 127 parts by weight of octadecyl isocyanate in 127 parts by weight of ethyl acetate, and the mixture obtained was stirred for 30 minutes by a homogenizer while maintaining a reaction temperature in a range of from 25° to 30° C., thereby a 17.5 wt. % water dispersion (average particle diameter: about 2 μm) of a polyethyleneimine-octadecyl isocyanate adduct was obtained. Furthermore, this 17.5 wt. % water dispersion of a polyethyleneimine-octadecyl isocyanate adduct was subjected to centrifugal separation, the separated adduct was washed by methanol and then, the solvent was removed by distillation under reduced pressure to obtain a residue, which showed a melting point of about 90° C.

SYNTHETIC EXAMPLE 5

Polyallylamine (number-average molecular weight: 10,000), 28 parts by weight, and 48 parts by weight of a cationic surfactant (which was an aqueous solution of stearyltrimethylammonium chloride having 63 wt. % nonvolatile content) were dissolved in 680 parts by weight of water to mix them. To the resultant aqueous mixed solution was added 244 parts by weight of an ethyl acetate solution, which was prepared by dissolving 122 parts by weight of octadecyl isocyanate in 122 parts by weight of ethyl acetate, and the mixture obtained was stirred for 30 minutes by a homogenizer while maintaining a reaction temperature in a range of from 25° to 30° C., thereby a 18 wt. % water dispersion (average particle diameter: about 2 μm) of a polyallylamine-octadecyl isocyanate adduct was obtained.

SYNTHETIC EXAMPLE 6

In a reaction vessel equipped with a stirrer, condenser and dropping funnel, 100 parts by weight of polyethyleneimine (number-average molecular weight: 70,000) was added to 1213 parts by weight of toluene and, by further adding 520 parts by weight of octadecyl isocyanate, the mixture obtained was allowed to react at the reflux temperature for 2 hours. Then, 120 parts by weight of toluene diisocyanate was added to further carry out a reaction, thereby the reaction mixture was gelated.

SYNTHETIC EXAMPLE 7

Polyethyleneimine (number-average molecular weight: 1,800), 23 parts by weight, and 36 parts by weight of a cationic surfactant (which was an aqueous solution of stearyltrimethylammonium chloride having 63 wt. % nonvolatile content) were dissolved in 675 parts by weight of water to mix them. To the resultant aqueous mixed solution was added 247 parts by weight of an ethyl acetate solution, which was prepared by dissolving 100 parts by weight of octadecyl isocyanate and 20 parts by weight of toluene diisocyanate in 127 parts by weight of ethyl acetate, and the mixture obtained was stirred for 30 minutes by a homogenizer while maintaining a reaction temperature in a range of from 25° to 30° C., thereby a 16.9 wt. % water dispersion (average particle diameter: about 2 μm) of a polyethyleneimine-octadecyl isocyanate adduct was obtained. Furthermore, this 16.9 wt. % water dispersion of a polyethyleneimine-octadecyl isocyanate adduct was subjected to centrifugal separation, the separated adduct was washed by methanol, and then, the solvent was removed by distillation under reduced pressure to obtain a residue, which showed a melting point of about 120° C.

SYNTHETIC EXAMPLE 8

In a reaction vessel equipped with a stirrer, condenser and dropping funnel, there was dispersed 100 parts by weight of polyethyleneimine (number-average molecular weight: 20,000) in 1587 parts by weight of toluene and added 580 parts by weight of octadecyl isocyanate. The mixture obtained was allowed to react at the reflux temperature for 3 hours and then, cooled, thereby a polyethyleneimine-octadecyl isocyanate adduct having 30 wt. % nonvolatile content was produced. Furthermore, this polyethyleneimine-octadecyl isocyanate adduct having 30 wt. % nonvolatile content was washed by methanol, and the solvent was removed by distillation under reduced pressure to obtain the adduct as white powder, which showed a melting point of about 90° C.

SYNTHETIC EXAMPLE 9

In a reaction vessel equipped with a stirrer, condenser and dropping funnel, there was dispersed 100 parts by weight of polyethyleneimine (number-average molecular weight: 20,000) in 1353 parts by weight of toluene and added 480 parts by weight of octadecyl isocyanate. The mixture obtained was allowed to react at the reflux temperature for 3 hours and then, cooled, thereby a polyethyleneimine-octadecyl isocyanate adduct having 30 wt. % nonvolatile content was produced. Furthermore, this polyethyleneimine-octadecyl isocyanate adduct having 30 wt. % nonvolatile content was washed by methanol, and the solvent was removed by distillation under reduced pressure to obtain the adduct as white powder, which showed a melting point of about 85° C.

SYNTHETIC EXAMPLE 10

Polyethyleneimine (number-average molecular weight: 1,800), 23 parts by weight, and 30 parts by weight of a cationic surfactant (which was an aqueous solution of stearyltrimethylammonium chloride having 63 wt. % nonvolatile content) were dissolved in 560 parts by weight of water to mix them. To the resultant aqueous mixed solution was added 220 parts by weight of an ethyl acetate solution, which was prepared by dissolving 110 parts by weight of octadecyl isocyanate in 110 parts by weight of ethyl acetate, and the mixture obtained was stirred for 30 minutes by a homogenizer while maintaining a reaction temperature in a range of from 25° to 30° C., thereby a 18.2 wt. % water dispersion (average particle diameter: about 2 μm) of a polyethyleneimine-octadecyl isocyanate adduct was obtained. Furthermore, this 18.2 wt. % water dispersion of a polyethyleneimine-octadecyl isocyanate adduct was subjected to centrifugal separation, the separated adduct was washed by methanol, and then, the solvent was removed by distillation under reduced pressure to obtain a residue, which showed a melting point of about 88° C.

SYNTHETIC EXAMPLE 11

In a reaction vessel equipped with a stirrer, condenser and dropping funnel, there was dispersed 100 parts by weight of polyethyleneimine (number-average molecular weight: 10,000) in 1587 parts by weight of toluene and added 580 parts by weight of a mixture of octadecyl isocyanate with hexadecyl isocyanate (mixing ratio by weight was about 7:3). The mixture obtained was allotted to react at the reflux temperature for 3 hours and then, cooled, thereby a polyethyleneimine-long chain alkyl isocyanate adduct having 30 wt. % nonvolatile content was produced. Furthermore, this polyethyleneimine-long chain alkyl isocyanate adduct having 30 wt. % nonvolatile content was washed by methanol and the solvent was removed by distillation under reduced pressure to obtain the adduct as white powder, which showed a melting point of about 85° C.

SYNTHETIC EXAMPLE 12

Polyethyleneimine (number-average: molecular weight: 1,200), 23 parts by weight, and 36 parts by weight of a cationic surfactant (which was an aqueous solution of stearyltrimethylammonium chloride having 63 wt. % nonvolatile content) were dissolved in 675 parts by weight of water to mix them. To the resultant aqueous mixed solution was added 254 parts by weight of an ethyl acetate solution, which was prepared by dissolving 127 parts by weight of a mixture of octadecyl isocyanate with hexadecyl isocyanate (mixing ratio by weight was about 7:3) in 127 parts by weight of ethyl acetate, and the mixture obtained was stirred for 30 minutes by a homogenizer while maintaining a reaction temperature in a range of from 25° to 30° C., thereby a 17.5 wt. % water dispersion (average particle diameter: about 2 μm) of a polyethyleneimine-long chain alkyl isocyanate adduct was obtained. Furthermore, this 17.5 wt. % water dispersion of a polyethyleneimine-long chain alkyl isocyanate adduct was subjected to centrifugal separation, the separated adduct was washed by methanol and then, the solvent was removed by distillation under reduced pressure to obtain a residue, which showed a melting point of about 85° C.

EXAMPLE 1

The polyethyleneimine-octadecyl isocyanate adduct, 40 parts by weight, obtained in SYNTHETIC EXAMPLE 1, was dissolved in 1960 parts by weight of toluene, and then, to the resultant solution was added 0.42 parts by weight of 1,6-hexamethylene diisocyanate, thereby a release coating composition having 0.61 wt. % nonvolatile content was obtained. Using this release coating composition, the undermentioned performance tests were carried out. Results obtained from the tests are shown in Table 2.

EXAMPLES 2 TO 8

Release coating compositions presented in Table 1 were obtained in a manner similar to EXAMPLE 1. For these release coating compositions were carried out the undermentioned performance tests. Results obtained from the tests are shown in Table 2.

COMPARATIVE EXAMPLE 1

A release coating composition having 0.6 wt. % nonvolatile content was obtained by dissolving 40 parts by weight of the polyethyleneimine-octadecyl isocyanate adduct, obtained in SYNTHETIC EXAMPLE 1, in 1960 parts by weight of toluene. For this release coating composition are shown in Table 2 results obtained from the performance tests.

COMPARATIVE EXAMPLES 2 AND 3

With the formulation shown in Table 1, release coating compositions were obtained in a manner similar to EXAMPLE 1. For these release coating compositions were carried out the undermentioned performance tests similarly to EXAMPLE 1. Results obtained from the tests are shown in Table 2.

COMPARATIVE EXAMPLE 4

The performance tests were similarly carried out for the twin axis-extended polypropylene film (hereinafter, referred to as "OPP film") and printing paper which were not coated with a release coating composition at all. Results obtained are shown in Table 2.

TABLE 1

| | | | EXAMPLE 1 | EXAMPLE 2 | EXAMPLE 3 | EXAMPLE 4 | EXAMPLE 5 | EXAMPLE 6 |
|---|---|---|---|---|---|---|---|---|
| Formulation of release coating composition (parts by weight) | Compound (A) | SYNTHETIC EXAMPLE No. | 1 | 1 | 1 | 1 | 1 | 2 |
| | | Parts | 40 | 40 | 40 | 40 | 40 | 40 |
| | Compound (B) | 1,6-Hexa-methylene diisocyanate | 0.42 | 0.21 | 1.26 | — | — | 0.42 |
| | | Diphenyl-methane diisocyanate | — | — | — | 0.42 | — | — |
| | | ELASTRON BN-P17 * | — | — | — | — | 0.42 | — |
| | Diluent (C) | Toluene | 1960 | 1960 | 1960 | 1500 | 1960 | 1960 |
| | | Xylene | — | — | — | 460 | — | — |
| Nonvolatile content (wt. %) | | | 0.61 | 0.6 | 0.62 | 0.61 | 0.61 | 0.61 |
| Pre-crosslinking reaction Conditions of release coating composition | | | not done (organic) solution | not done (organic) solution | not done (organic) solution | not done (organic) solution | not done (organic) solution | not done (organic) solution |

| | | | EXAMPLE 7 | EXAMPLE 8 | COMPARATIVE EXAMPLE 1 | COMPARATIVE EXAMPLE 2 | COMPARATIVE EXAMPLE 3 |
|---|---|---|---|---|---|---|---|
| Formulation of release coating composition (parts by weight) | Compound (A) | SYNTHETIC EXAMPLE No. | 3 | 11 | 1 | 2 | 3 |
| | | Parts | 48 | 40 | 40 | 40 | 48 |
| | Compound (B) | 1,6-Hexa-methylene diisocyanate | 0.42 | 0.42 | — | — | — |
| | | Diphenyl-methane diisocyanate | — | — | — | — | — |
| | | ELASTRON BN-P17 * | — | — | — | — | — |
| | Diluent (C) | Toluene | 1952 | 1960 | 1960 | 1960 | 1952 |
| | | Xylene | — | — | — | — | — |
| Nonvolatile content (wt. %) | | | 0.61 | 0.61 | 0.6 | 0.6 | 0.6 |
| Pre-crosslinking reaction Conditions of release coating composition | | | not done (organic) solution | not done (organic) solution | not done (organic) solution | not done (organic) solution | not done (organic) solution |

(Footnote)
*: 2-Butanone oxime-blocked diphenylmethane diisocyanate, made by Daiichi Kogyo Seiyaku Co., Ltd.

PERFORMANCE TESTS

1. Releasing performance test

Each of the release coating composition liquids was coated by a #5 bar coater on an OPP film face processed by the corona discharge and on a sheet of printing paper. Here, the coated amount corresponds to 0.05 g/m$^2$. After drying at 130° C. for 2 minutes, a rubber-based pressure sensitive adhesive tape (Orien Tape, made by Sekisui Kagaku Kogyo Co., Ltd.) and another rubber-based pressure sensitive adhesive tape (Scotch Brand Tape #375, made by Sumitomo 3M Co., Ltd.) were pasted onto the coated faces with pressure by a 2 kg self-weight roller and then, the resultant matters were cut into the tape size to obtain test pieces. Releasing performance was evaluated by measuring release resistance and residual adhesive strength of the test pieces which had been preserved under conditions of 60° C. and 85% RH for 4 days. For the release resistance was measured the resistance in performing the 90° angle release at a release rate of 300 mm/minute. For the residual adhesive strength was measured the resistance in pasting a tape part of the test piece once more onto a stainless panel followed by performing the 180° angle release at a release rate of 300 mm/minute.

2. Writing performance test

A line was drawn by a water-born ink pen (Sign Pen, made by Pentel Co., Ltd.) on an OPP film face, on which the release coating composition was coated, and shedding of the water-born ink was examined.

O: No shedding, easy to draw.
Δ: Somewhat shedding, however, drawing is possible.
x: Drawing is impossible.

TABLE 2

| | Releasing performance test | | | | | | | | |
|---|---|---|---|---|---|---|---|---|---|
| | OPP | | | | Printing paper | | | | |
| | Release resistance (g/25 mm) | | Residual adhesive strength (g/25 mm) | | Release resistance (g/25 mm) | | Residual adhesive strength (g/25 mm) | | Writing performance test |
| Base material | Orien Tape | Scotch Brand Tape | Orien Tape | Scotch Brand Tape | Orien Tape | Scotch Brand Tape | Orien Tape | Scotch Brand Tape | |
| EXAMPLE 1 | 250 | 230 | 570 | 700 | 280 | 290 | 490 | 720 | O |
| EXAMPLE 2 | 290 | 280 | 590 | 690 | 300 | 340 | 450 | 650 | O |
| EXAMPLE 3 | 270 | 250 | 550 | 650 | 300 | 300 | 460 | 700 | O |
| EXAMPLE 4 | 260 | 220 | 630 | 700 | 270 | 340 | 530 | 710 | O |
| EXAMPLE 5 | 300 | 230 | 510 | 650 | 300 | 350 | 460 | 720 | O |
| EXAMPLE 6 | 250 | 200 | 610 | 700 | 270 | 280 | 560 | 700 | O |
| EXAMPLE 7 | 290 | 310 | 590 | 700 | 300 | 290 | 490 | 690 | O |
| EXAMPLE 8 | 250 | 230 | 560 | 680 | 290 | 300 | 480 | 700 | O |
| COMPARATIVE EXAMPLE 1 | 300 | 360 | 450 | 510 | 310 | 380 | 380 | 600 | O |
| COMPARATIVE EXAMPLE 2 | 290 | 350 | 460 | 550 | 300 | 350 | 390 | 630 | O |
| COMPARATIVE EXAMPLE 3 | 320 | 370 | 440 | 500 | 320 | 350 | 390 | 610 | O |
| COMPARATIVE EXAMPLE 4 | 490 | 700 | 500 | 650 | 490 | * | 420 | * | X |

(Footnote)
*: Measurements were impossible because the base material was destroyed.

EXAMPLE 9

The water dispersion of the polyethyleneimine-octadecyl isocyanate adduct, 80 parts by weight, obtained in SYNTHETIC EXAMPLE 4, was diluted by 1920 parts by weight of a 10 wt. % aqueous n-propanol (which comprises 10 wt. % of n-propanol and 90 wt. % of water) and then, 3 parts by weight of a water dispersion (ELASTRON BN-69, made by Daiichi Kogyo Seiyaku Co., Ltd.) of 2-butanone oxime-blocked diphenylmethane diisocyanate was added to obtain a release coating composition having 0.76 wt. % nonvolatile content. For this release coating composition were carried out the above-mentioned performance tests similarly to EXAMPLE 1. Results obtained from the tests are shown in Table 4.

EXAMPLES 10 TO 14

With the formulation shown in Table 3, release coating compositions were obtained in a manner similar to EXAMPLE 9. For these release coating compositions were carried out the above-mentioned performance tests similarly to EXAMPLE 1. Results obtained from the tests are shown in Table 4.

COMPARATIVE EXAMPLES 5 AND 6

With the formulation shown in Table 3, release coating compositions were obtained in a manner similar to EXAMPLE 9. For these release coating compositions were carried out the above-mentioned performance tests similarly to EXAMPLE 1. Results obtained from the tests are shown in Table 4.

COMPARATIVE EXAMPLE 7

With the formulation shown in Table 3, a release coating composition was obtained in a manner similar to EXAMPLE 9. For this release coating composition were carried out the above-mentioned performance tests similarly to EXAMPLE 1. However, the release coating composition coated was inferior in film-forming performance (a release coating composition layer converted to a whitened condition and peeled off easily), so that the above-mentioned performance could not be evaluated.

TABLE 3

| | | | EXAMPLE 9 | EXAMPLE 10 | EXAMPLE 11 | EXAMPLE 12 | EXAMPLE 13 |
|---|---|---|---|---|---|---|---|
| Formulation of release coating composition (parts by weight) | Compound (A) | | SYNTHETIC EXAMPLE 4 80 | SYNTHETIC EXAMPLE 4 60 | SYNTHETIC EXAMPLE 4 60 | SYNTHETIC EXAMPLE 4 80 | SYNTHETIC EXAMPLE 5 80 |
| | Compound (B) | ELASTRON BN-69 * | 3 | 4.5 | 6.8 | — | 3 |
| | | ELASTRON BN-08 ** | — | — | — | 3 | — |
| | Diluent (C) | 10 wt. % aqueous n-propanol | 1920 | 1940 | 1940 | 1920 | 1920 |
| Nonvolatile content (wt. %) | | | 0.76 | 0.61 | 0.66 | 0.76 | 0.78 |
| Pre-crosslinking reaction | | | not done | not done | not done | not done | not done |
| Conditions of release coating composition | | | Water dispersion | Water dispersion | Water dispersion | Water dispersion | Water dispersion |

| | | | EXAMPLE 14 | COMPARATIVE EXAMPLE 5 | COMPARATIVE EXAMPLE 6 | COMPARATIVE EXAMPLE 7 |
|---|---|---|---|---|---|---|
| Formulation of release coating composition (parts by weight) | Compound (A) | | SYNTHETIC EXAMPLE 12 80 | SYNTHETIC EXAMPLE 4 80 | SYNTHETIC EXAMPLE 5 80 | SYNTHETIC EXAMPLE 7 80 |
| | Compound (B) | ELASTRON BN-69 * | 4.5 | — | — | — |
| | | ELASTRON BN-08 ** | — | — | — | — |
| | Diluent (C) | 10 wt. % aqueous n-propanol | 1940 | 1920 | 1920 | 1851 |
| Nonvolatile content (wt. %) | | | 0.76 | 0.70 | 0.72 | 0.7 |
| Pre-crosslinking reaction | | | not done | not done | not done | done |
| Conditions of release coating composition | | | Water dispersion | Water dispersion | Water dispersion | Water dispersion |

(Footnote)
*: 2-Butanone oxime-blocked diphenylmethane diisocyanate (40 wt. % water dispersion), made by Daiichi Kogyo Seiyaku Co., Ltd.
**: 2-Butanone oxime-blocked xylilene diisocyanate (40 wt. % water dispersion), made by Daiichi Kogyo Seiyaku Co., Ltd.

TABLE 4

| | Releasing performance test | | | | | | | | |
|---|---|---|---|---|---|---|---|---|---|
| | OPP | | | | Printing paper | | | | |
| | Release resistance (g/25 mm) | | Residual adhesive strength (g/25 mm) | | Release resistance (g/25 mm) | | Residual adhesive strength (g/25 mm) | | Writing performance test |
| Base material | Orien Tape | Scotch Brand Tape | Orien Tape | Scotch Brand Tape | Orien Tape | Scotch Brand Tape | Orien Tape | Scotch Brand Tape | |
| EXAMPLE 9 | 230 | 290 | 560 | 710 | 270 | 310 | 460 | 700 | ○ |
| EXAMPLE 10 | 230 | 300 | 560 | 740 | 270 | 320 | 450 | 730 | ○ |
| EXAMPLE 11 | 260 | 280 | 530 | 690 | 300 | 330 | 430 | 710 | ○ |
| EXAMPLE 12 | 240 | 300 | 510 | 720 | 270 | 310 | 450 | 730 | ○ |
| EXAMPLE 13 | 270 | 300 | 520 | 700 | 290 | 340 | 490 | 690 | ○ |
| EXAMPLE 14 | 250 | 310 | 540 | 680 | 270 | 320 | 470 | 710 | ○ |
| COMPARATIVE EXAMPLE 5 | 310 | 400 | 430 | 500 | 280 | 430 | 360 | 510 | ○ |
| COMPARATIVE EXAMPLE 6 | 300 | 410 | 440 | 490 | 300 | 450 | 370 | 480 | ○ |

EXAMPLE 15

The polyethyleneimine-octadecyl isocyanate adduct, 30 parts by weight, obtained in SYNTHETIC EXAMPLE 8, was dissolved in 1482 parts by weight of toluene and then, 0.72 parts by weight of EPIKOATE 828 was added to obtain a release coating composition having 0.64 wt. % nonvolatile content. Using this release coating composition, the above-mentioned performance tests were carried out. Results obtained from the tests are shown in Table 6.

EXAMPLES 16 TO 26

Release coating compositions shown in Table 5 were obtained in a manner similar to EXAMPLE 15. For these release coating compositions were carried out the above-mentioned performance tests similarly to EXAMPLE 1. Results obtained from the tests are shown in Table 6.

COMPARATIVE EXAMPLE 8

The polyethyleneimine-octadecyl isocyanate adduct, 30 parts by weight, obtained in SYNTHETIC EXAMPLE 8, was dissolved in 1482 parts by weight of toluene to obtain a release coating composition having 0.6 wt. % nonvolatile content. Results obtained from the performance tests of this release coating composition are shown in Table 6.

COMPARATIVE EXAMPLES 9 AND 10

With the formulation shown in Table 5, release coating compositions were obtained in a manner similar to EXAMPLE 1. For these release coating compositions were carried out the above-mentioned performance tests similarly to EXAMPLE 1. Results obtained from the tests are shown in Table 6.

TABLE 5

| | | | EXAMPLE 15 | EXAMPLE 16 | EXAMPLE 17 | EXAMPLE 18 | EXAMPLE 19 | EXAMPLE 20 |
|---|---|---|---|---|---|---|---|---|
| Formulation of release coating composition (parts by weight) | Compound (A) | SYNTHETIC EXAMPLE No. | 8 | 9 | 9 | 9 | 9 | 10 |
| | | Parts | 30 | 30 | 30 | 30 | 30 | 60 |
| | Compound (B) | EPIKOATE 828 *1 | 0.72 | 0.72 | 1.44 | — | — | — |
| | | EPYCLON EM85-75W *2 | — | — | — | — | — | 0.96 |
| | | DENACOL EX321 *3 | — | — | — | — | — | — |
| | | ARONIX E-400 *4 | — | — | — | — | — | — |
| | | ARONIX M-400 *5 | — | — | — | 0.40 | — | — |
| | | CHEMITITE PZ-33 *6 | — | — | — | — | 0.54 | — |
| | | 40% glyoxal | — | — | — | — | — | — |
| | | Diethyl oxalate | — | — | — | — | — | — |
| | | SUMIMAL M-55 *7 | — | — | — | — | — | — |
| | Diluent (C) | Toluene | 1482 | 1482 | 1482 | 1482 | 1482 | — |
| | | 10 wt. % aqueous n-propanol | — | — | — | — | — | 1440 |
| Nonvolatile content (wt. %) | | | 0.64 | 0.64 | 0.69 | 0.62 | 0.63 | 0.78 |
| Conditions of release coating composition | | | (organic) solution | (organic) solution | (organic) solution | (organic) solution | (organic) solution | Water dispersion |

| | | | EXAMPLE 21 | EXAMPLE 22 | EXAMPLE 23 | EXAMPLE 24 | EXAMPLE 25 | EXAMPLE 26 |
|---|---|---|---|---|---|---|---|---|
| Formulation of release coating composition (parts by weight) | Compound (A) | SYNTHETIC EXAMPLE No. | 10 | 10 | 10 | 10 | 10 | 10 |
| | | Parts | 60 | 60 | 60 | 60 | 60 | 60 |
| | Compound (B) | EPIKOATE 828 *1 | — | — | — | — | — | — |
| | | EPYCLON EM85-75W *2 | 1.92 | — | — | — | — | — |
| | | DENACOL EX321 *3 | — | 0.54 | — | — | — | — |
| | | ARONIX E-400 *4 | — | — | 1.11 | — | — | — |
| | | ARONIX M-400 *5 | — | — | — | — | — | — |
| | | CHEMITITE PZ-33 *6 | — | — | — | — | — | — |
| | | 40% glyoxal | — | — | — | 0.27 | — | — |
| | | Diethyl oxalate | — | — | — | — | 0.28 | — |
| | | SUMIMAL M-55 *7 | — | — | — | — | — | 0.63 |
| | Diluent | Toluene | — | — | — | — | — | — |

TABLE 5-continued

| | | | | | | | | |
|---|---|---|---|---|---|---|---|---|
| | (C) | 10 wt. % aqueous n-propanol | 1440 | 1440 | 1440 | 1440 | 1440 | 1440 |
| Nonvolatile content (wt. %) | | | 0.82 | 0.76 | 0.75 | 0.73 | 0.75 | 0.76 |
| Conditions of release coating composition | | | Water dispersion | Water dispersion | Water dispersion | Water dispersion | Water dispersion | Water dispersion |

| | | | | COMPARATIVE EXAMPLE 8 | COMPARATIVE EXAMPLE 9 | COMPARATIVE EXAMPLE 10 |
|---|---|---|---|---|---|---|
| Formulation of release coating composition (parts by weight) | Compound (A) | SYNTHETIC EXAMPLE No. | 8 | 9 | 10 |
| | | Parts | 30 | 30 | 60 |
| | Compound (B) | EPIKOATE 828 *1 | — | — | — |
| | | EPYCLON EM85-75W *2 | — | — | — |
| | | DENACOL EX321 *3 | — | — | — |
| | | ARONIX E-400 *4 | — | — | — |
| | | ARONIX M-400 *5 | — | — | — |
| | | CHEMITITE PZ-33 *6 | — | — | — |
| | | 40% glyoxal | — | — | — |
| | | Diethyl oxalate | — | — | — |
| | | SUMIMAL M-55 *7 | — | — | — |
| | Diluent (C) | Toluene | 1482 | 1482 | — |
| | | 10 wt. % aqueous n-propanol | — | — | 1440 |
| Nonvolatile content (wt. %) | | | 0.60 | 0.60 | 0.73 |
| Conditions of release coating composition | | | (organic) solution | (organic) solution | Water dispersion |

(Footnote)
*1: Bisphenol A diglycidyl ether, made by Yuka Shell Epoxy Co., Ltd.
*2: Emulsion of bisphenol A diglycidyl ether (75 wt. % water dispersion), made by Dai Nippon Ink Kagaku Kogyo Co., Ltd.
*3: Trimethylolpropane polyglycidyl ether of a water-soluble polyvalent epoxy compound, made by Nagase Kasei Kogyo Co., Ltd.
*4: Hexafunctional acrylate emulsion, made by Toa Gosei Kagaku Kogyo Co., Ltd.
*5: Hexafunctional acrylate, made by Toa Gosei Kagaku Kogyo Co., Ltd.
*6: Trifunctional aziridinyl compound, made by Nippon Shokubai Co., Ltd.
*7: Water-soluble methylated melamine, made by Sumitomo Kagaku Kogyo Co., Ltd.

TABLE 6

| | Releasing performance test | | | | | | | |
|---|---|---|---|---|---|---|---|---|
| | OPP | | | | Printing paper | | | |
| | Release resistance (g/25 mm) | | Residual adhesive strength (g/25 mm) | | Release resistance (g/25 mm) | | Residual adhesive strength (g/25 mm) | |
| Base material | Orien Tape | Scotch Brand Tape | Orien Tape | Scotch Brand Tape | Orien Tape | Scotch Brand Tape | Orien Tape | Scotch Brand Tape |
| EXAMPLE 15 | 210 | 150 | 560 | 680 | 240 | 220 | 510 | 660 |
| EXAMPLE 16 | 200 | 150 | 580 | 700 | 220 | 210 | 520 | 670 |
| EXAMPLE 17 | 200 | 150 | 600 | 710 | 210 | 220 | 540 | 690 |
| EXAMPLE 18 | 220 | 150 | 590 | 690 | 250 | 260 | 490 | 680 |
| EXAMPLE 19 | 230 | 150 | 580 | 690 | 260 | 250 | 500 | 670 |
| EXAMPLE 20 | 270 | 200 | 610 | 800 | 290 | 290 | 550 | 790 |
| EXAMPLE 21 | 250 | 150 | 630 | 850 | 250 | 280 | 580 | 830 |

TABLE 6-continued

| | Releasing performance test | | | | | | | |
|---|---|---|---|---|---|---|---|---|
| | OPP | | | | Printing paper | | | |
| | Release resistance (g/25 mm) | | Residual adhesive strength (g/25 mm) | | Release resistance (g/25 mm) | | Residual adhesive strength (g/25 mm) | |
| Base material | Orien Tape | Scotch Brand Tape | Orien Tape | Scotch Brand Tape | Orien Tape | Scotch Brand Tape | Orien Tape | Scotch Brand Tape |
| EXAMPLE 22 | 280 | 230 | 600 | 750 | 310 | 300 | 560 | 720 |
| EXAMPLE 23 | 290 | 280 | 590 | 700 | 300 | 340 | 550 | 730 |
| EXAMPLE 24 | 300 | 250 | 600 | 730 | 310 | 320 | 530 | 700 |
| EXAMPLE 25 | 300 | 280 | 580 | 700 | 310 | 350 | 520 | 710 |
| EXAMPLE 26 | 290 | 290 | 590 | 740 | 300 | 310 | 510 | 690 |
| COMPARATIVE EXAMPLE 8 | 300 | 340 | 450 | 510 | 310 | 360 | 400 | 560 |
| COMPARATIVE EXAMPLE 9 | 290 | 320 | 490 | 520 | 300 | 350 | 430 | 550 |
| COMPARATIVE EXAMPLE 10 | 310 | 400 | 430 | 540 | 280 | 440 | 370 | 510 |

What is claimed is:

1. A release coating composition comprising compound (A), compound (B) and diluent (C), wherein compound (A) is an alkyl addition compound which is a product from an additive reaction between a polyamine compound (a1) and a monoisocyanate compound (a2), said polyamine compound (a1) having at least two active hydrogen-containing amino groups per one molecule and being selected from the group consisting of polyalkyleneimines, polyalkylenepolyamines, polyvinylamines, polyallylamines and modified compounds of polyvinylamine or polyallylamine using as a copolymerizable monomer at least one selected from the group consisting of olefins, (meth)acrylamide, N,N-dimethyl (meth)acrylamide, unsaturated carboxylic acids, esters or anhydrides thereof, vinyl sulfonic acid, dimethylaminoethyl (meth)acrylate, vinylimidazole, vinylpyridine and vinylsuccinimide, and said monoisocyanate compound (a2) being an alkyl monoisocyanate having an alkyl group of 8 or more in carbon number;

compound (B) has, per one molecule, at least two functional groups capable of reacting with an active hydrogen of the amino group, and is at least one member selected from the group consisting of a polyvalent isocyanate compound having at least two isocyanate groups, a polyvalent epoxy compound having at least two epoxy groups, a polyvalent (meth)acryloyl compound having at least two (meth)acryloyl groups, a polyvalent carbonyl compound having at least two carbonyl groups, a polyvalent active ester compound having at least two active ester groups, a polyvalent methylol compound having at least two methylol groups, and a polyvalent aziridinyl compound having at least two aziridinyl groups; and the diluent (C) is at least one selected from the group consisting of an organic solvent and water.

2. A release coating composition as claimed in claim 1, wherein the adding ratio of the compound (a2) to the compound (a1) is set so that the compound (a2) amount of ranges from 0.6 to 1.3 mole times the amount of active hydrogen-containing amino groups in compound (a1).

3. A release coating composition as claimed in claim 1, wherein the compound (a1) is a polyalkyleneimine.

4. A release coating composition as claimed in claim 1, wherein the compound (a2) has an alkyl group of from 12 to 30 in carbon number.

5. A release coating composition as claimed in claim 1, wherein compound (B) comprises a polyvalent isocyanate compound having at least two blocked isocyanate groups.

6. A release coating composition as claimed in claim 1, wherein compound (B) is used in an amount of from 0.5 to 100 parts by weight based on 100 parts by weight of compound (A).

7. A release coating composition as claimed in claim 1, wherein the total amount of compounds (A) and (B) is from 0.1 to 60 wt. % and the amount of diluent (C) is from 40 to 99.9 wt. %, with the proviso that the total of the (A), (B) and (C) is 100 wt. %.

8. A release coating composition as claimed in claim 1, wherein compounds (A) and (B) are dissolved in an organic solvent.

9. A release coating composition as claimed in claim 1, wherein either one or both of the compounds (A) and (B) are dissolved or dispersed in water.

10. A release coating composition as claimed in claim 1, wherein compound (A) is a water-dispersible compound, and compound (B) is at least one compound selected from a group consisting of a water-dispersible polyvalent isocyanate compound having at least two blocked isocyanate group, a water-dispersible polyvalent epoxy compound having at least two epoxy groups, and a water-soluble polyvalent epoxy compound having at least two epoxy groups.

11. A release sheet comprising sheet base material and a release coating composition layer which has attached to at least one face of the base material and has been converted into one united body with the base material, wherein the release coating composition layer comprises a reaction product between the compounds (A) and (B) which are components of the release coating composition as claimed in any one of claims 1 to 10.

12. A release coating composition as claimed in claim 1, wherein said monoisocyanate compound (a2) is an alkyl monoisocyanate having an alkyl group of 12 to 30 in carbon number.

13. A release coating composition as claimed in claim 1, wherein said monoisocyanate compound (a2) is selected from the group consisting of dodecyl isocyanate, tridecyl isocyanate, tetradecyl isocyanate, pentadecyl isocyanate, hexadecyl isocyanate, octadecyl isocyanate, nonadecyl isocyanate and eicosyl isocyanate.

14. A release coating composition as claimed in claim 1, wherein said compound (B) is at least one member selected from the group consisting of a polyvalent isocyanate compound having at least two isocyanate groups, a polyvalent epoxy compound having at least two epoxy groups, and a polyvalent (meth)acryloyl compound having at least two (meth)acryloyl groups.

15. A release coating composition as claimed in claim 14, wherein said compound (B) comprises a polyvalent isocyanate compound having at least two blocked isocyanate groups.

16. A release coating composition as claimed in claim 1, wherein said compound (A) is an adduct from an additive reaction between polyethyleneimine and octadecyl isocyanate.

17. A release coating composition as claimed in claim 1, wherein said compound (A) is an adduct from an additive reaction between polypropyleneimine and octadecyl isocyanate.

18. A release coating composition as claimed in claim 1, wherein said compound (A) is an adduct from an additive reaction between polyallylamine and octadecyl isocyanate.

19. A release coating composition as claimed in claim 1, wherein said compound (A) is an adduct from an additive reaction between polyethyleneimine and a mixture of octadecyl isocyanate and hexadecyl isocyanate.

20. A release coating composition as claimed in claim 1, wherein said compound (B) is 1,6-hexamethylene diisocyanate.

21. A release coating composition as claimed in claim 1, wherein said compound (B) is diphenylmethane diisocyanate.

22. A release coating composition as claimed in claim 1, wherein said compound (B) is 2-butanone oxime-blocked diphenylmethane diisocyanate.

23. A release coating composition as claimed in claim 1, wherein said compound (B) is 2-butanone oxime-blocked xylilene diisocyanate.

24. A release coating composition as claimed in claim 1, wherein said compound (B) is bisphenol A diglycidyl ether.

25. A release coating composition as claimed in claim 1, wherein said compound (B) is trimethylolpropane polyglycidyl ether of a water-soluble polyvalent epoxy compound.

26. A release coating composition as claimed in claim 1, wherein said compound (B) is hexafunctional acrylate.

27. A release coating composition as claimed in claim 1, wherein said compound (B) is trifunctional aziridinyl compound.

28. A release coating composition as claimed in claim 1, wherein said compound (B) is glyoxal.

29. A release coating compound as claimed in claim 1, wherein said compound (B) is diethyl oxalate.

30. A release coating composition as claimed in claim 1, wherein said compound (B) is water-soluble methylated melamine.

* * * * *